US008594197B2

(12) United States Patent
Gonen et al.

(10) Patent No.: US 8,594,197 B2
(45) Date of Patent: Nov. 26, 2013

(54) SYSTEM AND METHOD FOR RELATIVE STORAGE OF VIDEO DATA

(75) Inventors: Eran Gonen, Herzlia (IL); Elad Golan, Maor (IL)

(73) Assignee: Nice Systems Ltd., Raanana (IL)

(*) Notice: Subject to any disclaimer, the term of this patent is extended or adjusted under 35 U.S.C. 154(b) by 969 days.

(21) Appl. No.: 12/699,015

(22) Filed: Feb. 2, 2010

(65) Prior Publication Data
US 2011/0188569 A1 Aug. 4, 2011

(51) Int. Cl.
*H04N 11/02* (2006.01)
(52) U.S. Cl.
USPC .................................. 375/240.12; 348/409.1
(58) Field of Classification Search
None
See application file for complete search history.

(56) References Cited

U.S. PATENT DOCUMENTS

| 7,738,676 B1* | 6/2010 | Evans et al. ................ 382/100 |
| 2005/0089235 A1* | 4/2005 | Sakaguchi et al. ........... 382/239 |
| 2009/0268974 A1* | 10/2009 | Takagi ........................ 382/238 |

\* cited by examiner

*Primary Examiner* — Christopher S Kelley
*Assistant Examiner* — Christopher Findley
(74) *Attorney, Agent, or Firm* — Pearl Cohen Zedek Latzer Baratz, LLP

(57) ABSTRACT

System and method for compressing and decompressing of differentially encoded video streams. I-frames of the encoded video stream may be relatively compressed and decompressed, thereby reducing video data size of an already encoded video stream. Compression and decompression may be lossless processes and may typically require relatively low processing power and small memory sizes.

19 Claims, 8 Drawing Sheets

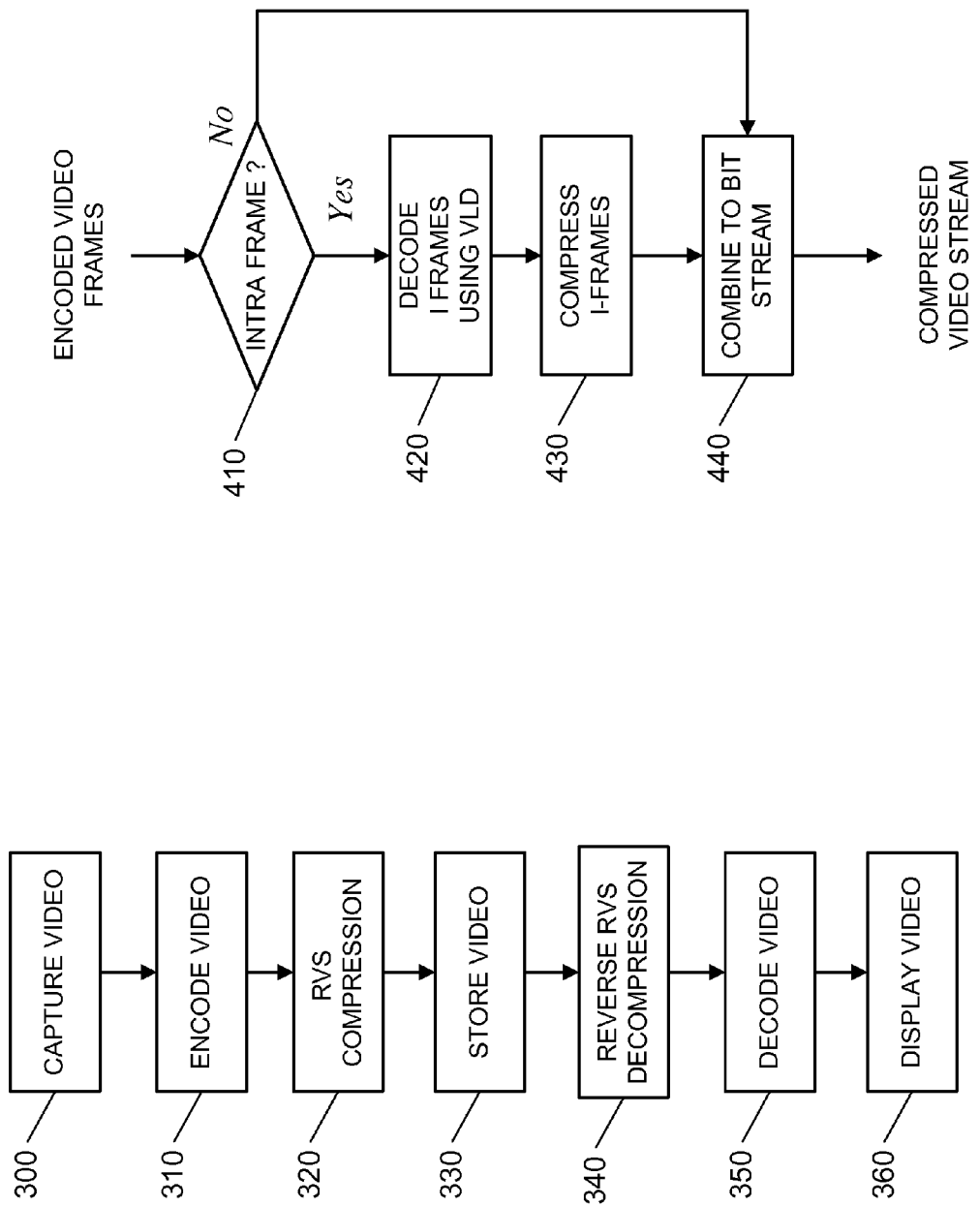

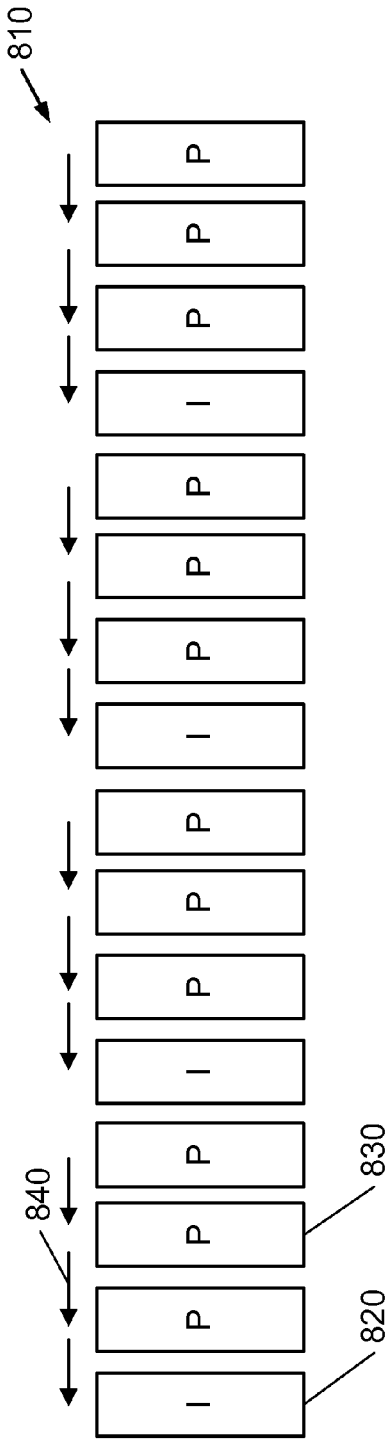
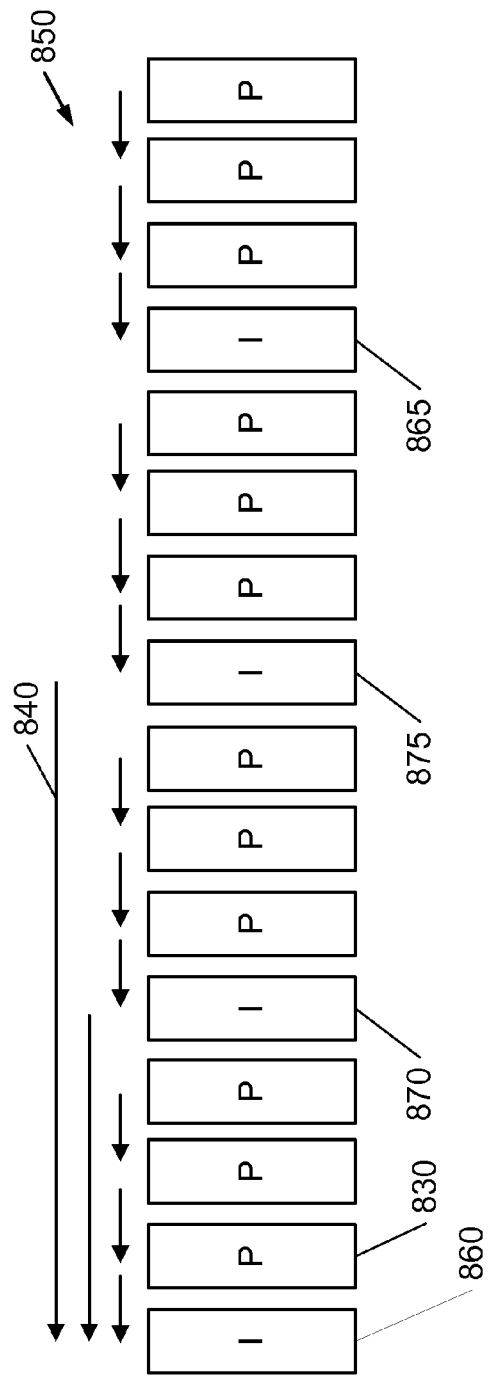

SYSTEM AND METHOD FOR RELATIVE STORAGE OF VIDEO DATA

BACKGROUND OF THE INVENTION

Video compression may be desirable for reducing the required video storage space and for reducing the bandwidth for transmission of digital video data. For example, modern video surveillance systems may require large amounts of memory storage space for recording video captured by a large amount of cameras for long time periods. Video compression may also be desirable for streaming video, as it is known in the art, where video content is distributed over a computer network, for example, for use in an Internet Protocol Television (IPTV) system.

Some video encoding formats, including but not limited to, for example, H.263, H.264, MPEG-4 part 2, MPEG-4 part 10, and the like, include two principal types of compressed frames, or slices: independent frames, known as INTRA frames (or I-frames), and dependent frames, known as "INTER" frames. I-frames are compressed independently, irrespective of other frames, while INTER frames may record only the differentiating data between frames. Thus, the original video data may be reconstructed independently from an I-frame, making it the starting point for the decoding process. However, the achievable compression ratio for an I-frame is typically lower than the compression ratio for INTER frame, and thus, I-frames usually require larger storage space than INTRA frames. For example, video from surveillance systems usually has a spatially high temporal redundancy level, because it may typically overview a static scene with motion a small portion of the frame, e.g., less than 20% of the frame.

The distance between two consecutive I-frames is called INTRA cycle (IC). One method of reducing the storage space required for recording video and to reduce the bandwidth required to transport compressed video streams is to increase the IC. For example, MPEG-2 and MPEG-4 part 10 allow large IC, e.g., one I-frame every five seconds. However, as the receiving decoder may need to wait for an I-frame before displaying a complete image, an increase in IC may translate into longer frame reconstruction times. Additionally, small IC allows substantially random access to the video sequence. In video networking, small IC may improve overall video quality as I-frames end the accumulation of errors in the video sequence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a flowchart illustration of a method for performing RVS compression according to embodiments of the invention;

FIG. 4 is a flowchart illustration of the RVS compression algorithm according to embodiments of the invention;

FIGS. 8A and 8B depict illustrations of an exemplary frame structure of a standard encoded video and the same video stream after compression using the RVS compression algorithm, respectively, according to embodiments of the invention.

Figure 1:
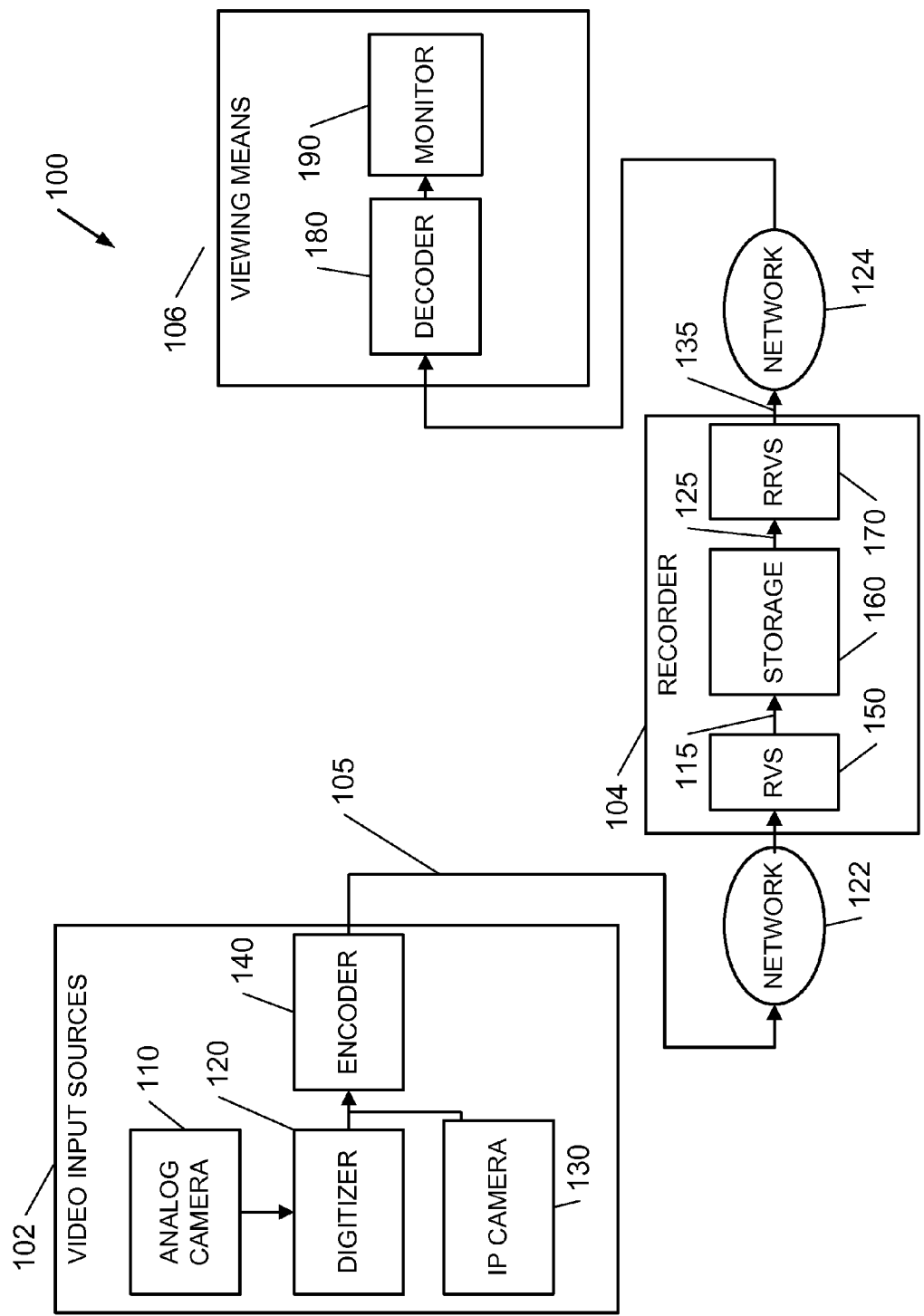
FIG. 1 is a high-level diagram of an exemplary relative video storage system (RVS) according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Reference is made to FIG. 1 depicting a high-level diagram of an exemplary Relative Video Storage (RVS) system 100 according to embodiments of the invention. According to embodiments of the invention, system 100 may comprise a variety of video input sources 102, a recorder 104 and viewing means 106. Video input sources 102 may include any one or more of various video capturing systems, such as one or more Internet Protocol cameras (IP cameras) 130 or one or more analog cameras 110 coupled to digitizer 120. The digital signal from a video input source, e.g., digitizer 120 and/or IP camera 130, may be encoded according to a relative video standard, e.g., H263, H263+, MPEG4, or H264 by encoder 140, to output a standard encoded video stream 105 to be sent over a network 122 to recorder 104 and stored. Viewing means 106 may receive a standard encoded video stream 135. Standard encoded video stream 135 may be decoded by decoder 180 and displayed by monitor 190. Standard encoded video stream 105 may be streamed via a network 122 such as an IP network, Asynchronous Transfer Mode (ATM) network, or any other network suitable for streaming video to recorder 104. When a client wants to view a recorded video, recorder 104 may send standard encoded video stream 135 via a network 124 such as an IP network, Asynchronous Transfer Mode (ATM) network or any other network suitable for streaming video to a viewing means 106. It will be recognized that in some embodiments of the invention, network 122 and network 124 may be the same network.

Recorder 104 may comprise a RVS encoder 150, storage medium 160, such as hard disks or a redundant array of inexpensive disks (RAIDs), and reverse-RVS decoder 170. RVS encoder 150 may further compress standard encoded video stream 105 using the RVS algorithm, to decrease the size of the video data and thereby decrease the size of storage medium 160 needed to store the video. RVS compressed video stream 115 may be stored in storage medium 160. Reverse-RVS decoder 170 may receive the RVS compressed video 125 from storage medium 160 and may decompress it using the reverse-RVS algorithm to output a standard encoded video stream 135. The RVS compression and reverse-RVS decompression algorithms will be described in detail further in this document.

According to the embodiment of the invention presented in FIG. 1, the RVS algorithm and the reverse-RVS algorithm may be internal processes to recorder 104, for example, performed by a set of instructions stored in a memory and executed on a processor associated with the recorder. Recorder 104 may further compress the received standard encoded video 105 using to the RVS algorithm before the video stream is stored, and decompress it using the reverse-RVS algorithm to output a standard encoded video stream 135, which may be substantially identical to received standard encoded video 105.

According to some embodiment of the invention, for example, as depicted in FIG. 1, recorder 104 may be substantially the only component in the system that may be affected by the RVS process. Other components may not be affected by the RVS compressing and decompressing processes. Thus, encoder 140 and decoder 180 may be standard components conforming to a selected relative video standard. Therefore, implementing some embodiment of the invention, for example, as depicted in FIG. 1, may not require substantially any changes and adjustments to video input sources 102 and viewing means 106.

Figure 2:
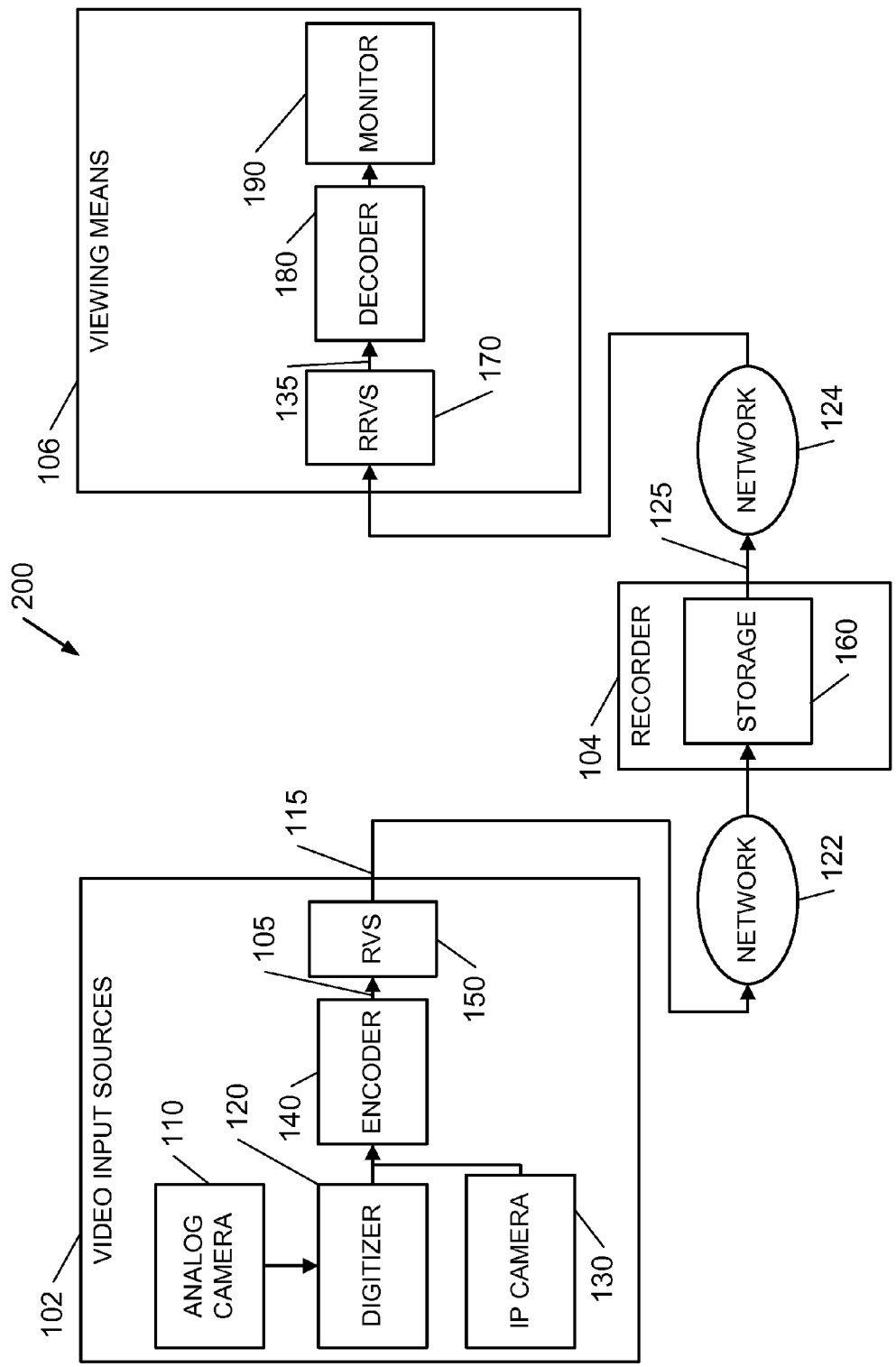
FIG. 2 is a high-level diagram of a modified exemplary Relative Video Storage (RVS) system according to embodiments of the invention.

Reference is made to FIG. 2, which depicts a high-level diagram of a modified exemplary Relative Video Storage (RVS) system 200 according to embodiments of the invention. According to embodiments of the invention, in system 200, reverse-RVS decoder 170 may be an internal part to viewing means 106. According to some embodiments of the invention, for example, as presented in FIG. 2, RVS compressed video 125 may be streamed between recorder 104 and viewing means 106 via network 124. Thus, the bandwidth of network 124 required for streaming RVS compressed video 125 may be lower in comparison to the bandwidth of network 124 required for streaming standard encoded video stream 135. In a similar manner, RVS encoder 150 may become an internal part to video input sources 102, thus reducing the bandwidth required of network 122 to stream the video. Other aspects of system 200 may resemble system 100.

Reference is now made to FIG. 3, which is a flowchart illustration of a method for performing RVS compression according to embodiments of the invention. According to embodiments of the invention, video may be captured (block 300) and encoded according to a relative video encoding standard, e.g., H263, H263+, MPEG4, H264, or another suitable standard (block 310). The video may be further compressed using the RVS compression algorithm (block 320) and stored (block 330). The stored video may be decoded using the reverse-RVS decompression algorithm (block 340), and further decoded (block 350) according to a decoding algorithm respective to encoding standard used for encoding in block 310. After decoding the video may be presented (block 360).

Reference is now made to FIG. 4, which is a flowchart illustration of the RVS compression algorithm according to embodiments of the invention. According to embodiments of the invention, the RVS compression algorithm may compress substantially only the I-frames. Accordingly, I-frames may be separated from the INTER frames (block 410). This may be done, for example, using an indication of the frame type by a dedicated field in the header of the video frame. For example, for video streams encoded according to MPEG4 standard, frame type may typically indicated by a section called vop_coding_type in a header of the video frame called Video Object Plane (VOP). For video streams encoded according to H264 standard, the video is built out of slices, wherein each slice has a slice header which describes the slice type. Therefore, determining which frame is an I-frame may be done by reading the respective field of the frame header. I-frames may then be decoded (block 420) using, for example, standard variable length decoding (VLD). Decoding I-frames using VLD may reverse the last phase of INTRA encoding, e.g., the variable length coding (VLC), and may result in blocks that contain the Discrete Cosine Transform (DCT) coefficients of the I video frame after quantization. The quantization phase need not be reversed, so that the RVS I-frames compression would be lossless. The decoded I-frames may then be compressed using the RVS compression algorithm (block 430), for example, as described in detail below. The compressed I-frames are then combined with the substantially intact INTER frames to create the compressed video stream (block 440).

Figure 5A:
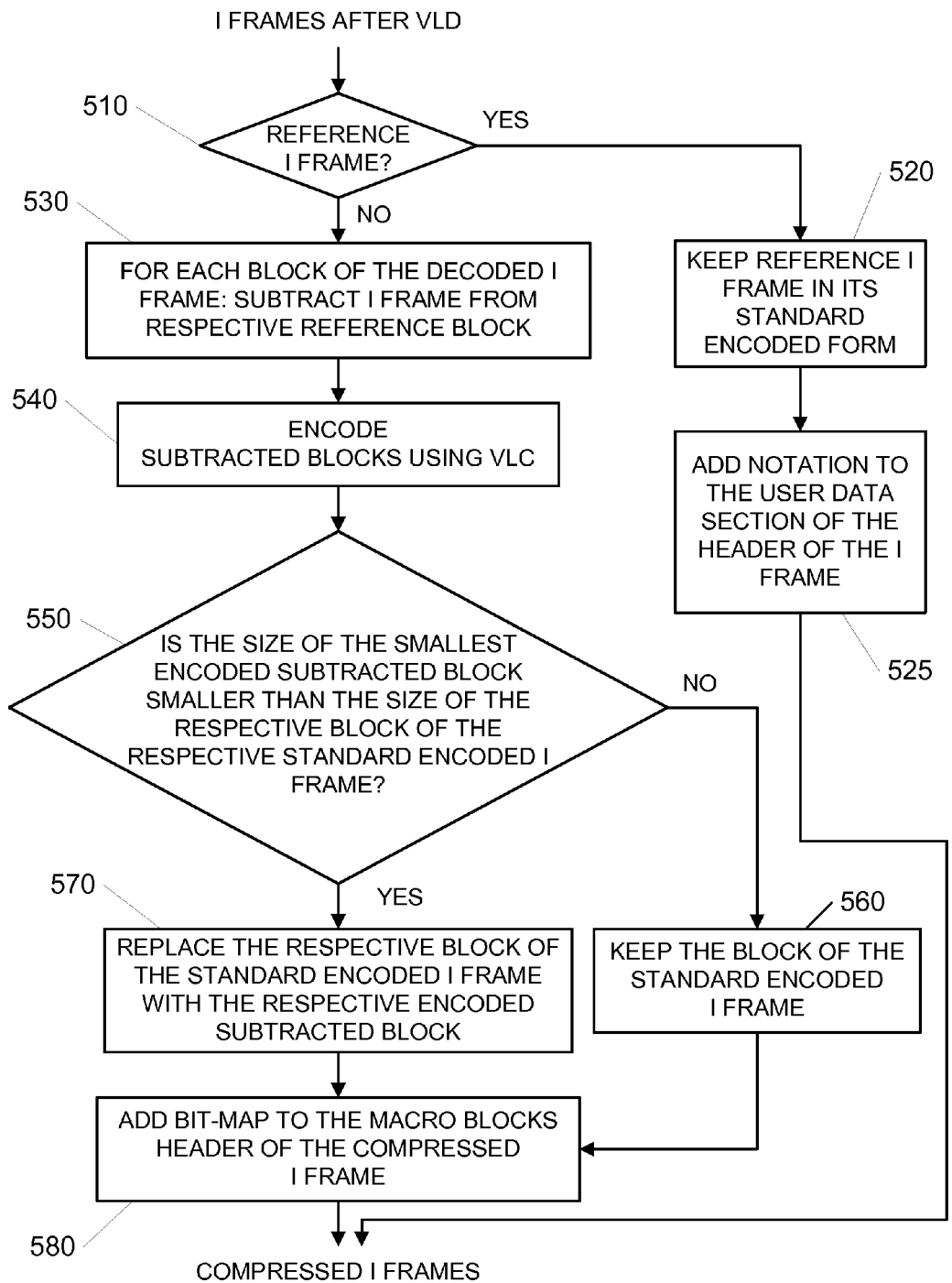
FIG. 5A is flowchart illustration of a method for performing RVS compression of I-frames according to embodiments of the invention.
Figure 5B:
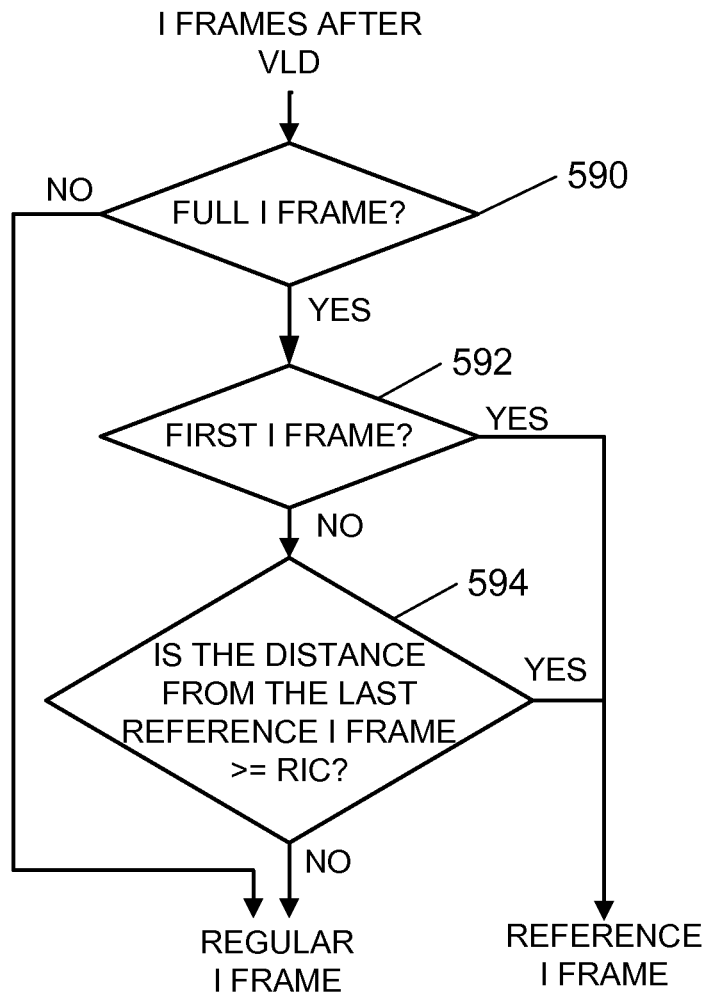
FIG. 5B is flowchart illustration of a method for determining whether an I-frame is a reference I-frame or a regular I-frame according to embodiments of the invention.

Reference is now made to FIG. 5A, which is a flowchart illustration of a method for performing RVS compression of I-frames according to embodiments of the invention. According to some embodiments of the invention, the method illustrated in FIG. 5A may be an expansion of block 430 of FIG. 4. According to embodiments of the invention, it may be determined whether the current I-frame is a reference I-frame, which should be left in its original standard encoded form, or a regular I-frame, e.g., not a reference I-frame, which should be compressed (block 510). A flowchart illustration of an exemplary method for determining whether an I-frame is a reference I-frame or a regular I-frame according to embodiments of the invention is presented in FIG. 5B. According to embodiments of the invention, it may be verified that the current I-frame is full, e.g., that there are no missing or defective blocks in the current I-frame (block 590). If the current I-frame is not full, it may typically not be considered a reference I-frame, insofar as selecting a reference I-frame with missing or defective blocks may degrade the video quality for the entire Reference INTRA Cycle (RIC), e.g., the I-frames in a group that comprise a reference I-frame and the regular I-frames that relate to that reference I-frame. Therefore, if the current frame is not full, it will typically not be considered a reference I-frame. If the current frame is full, it may be determined whether the current I-frame is the first I-frame of the video stream. If the current I-frame is the first I-frame of the video stream, it may be decided that the current I-frame is a reference I-frame (block 592). Otherwise, if the distance from the last reference I-frame to the current I-frame is greater than or equal to the RIC, it may be decided that the current I-frame is a reference I-frame (block 594). If the current I-frame is not the first I-frame and the distance from the last reference I-frame is less than the RIC, it may be decided that the current I-frame may be a regular I-frame. Alternatively, other methods for determining whether an I-frame is a reference I-frame or a regular I-frame may be utilized.

According to embodiments of the invention, RIC may be a predetermined input parameter, for example, as determined by a system designer. When compressing a video stream with different RICs, the compression ratio may improve as RIC increases, since more I-frames may be compressed. However, a large RIC may cause difficulty at the decompressing side. For example, if decompressing starts at a random point in the video stream, the RVS decoder may have to search for the reference I-frames on which the current I-frames depend. If the RIC is large, searching back for the relevant reference I-frames may require retrieving and checking many previous frames of the video. In some embodiments of the invention, RIC may be a parameter between 10 and 200. In some embodiments of the invention, RIC may be a parameter between 2 and 30.

If the current I-frame is a reference I-frame, the current I-frame may be kept in its original standard encoded form (block 520) to be later combined with the compressed video stream. A notation may be added to the user data section of the reference I-frame indicating that this frame is a reference I-frame (block 525). The blocks of the reference I-frame may also be used as reference for the regular I-frames (block 530) of the RIC starting with the current reference I-frame. If the current I-frame is a regular I-frame, then each block of the current I-frame may be subtracted from a respective reference block. The reference block may be the respective block of the respective reference I-frame, the respective block of the previous I-frame, or an average of a plurality of the respective blocks of the previous or next I-frames. According to embodiments of the invention, one or more reference blocks may be generated for each block.

In cases where a block of the current I-frame resembles one of the respective reference blocks, the result of the subtraction (the subtracted block) may contain less data, and may be more efficiently compressed relatively to the standard encoding of the original block of the current I-frame. The subtracted blocks may then be encoded using, for example, a Variable Length Compression (VLC) method (block 540). Then, for each block of the current I-frame, it may be determined which block is the smallest: the respective standard encoded block of the current I-frame, or one of the encoded subtracted blocks (block 550). If based on the comparison, one of the encoded subtracted blocks is the smallest, then the respective block of the standard encoded I-frame may be replaced with such smallest encoded subtracted block (block 570). Otherwise, the respective standard encoded block of the current I-frame may be saved (block 560).

According to embodiments of the invention, a bitmap may be added to the Macro Blocks (MB) header of the current I-frame. The bitmap may contain one or more bits per block that may indicate whether the block is the standard encoded block or an encoded subtracted block. In case there were several possible encoded subtracted blocks, the bitmap may also indicate which of encoded subtracted blocks was saved (block 580).

Figure 6:
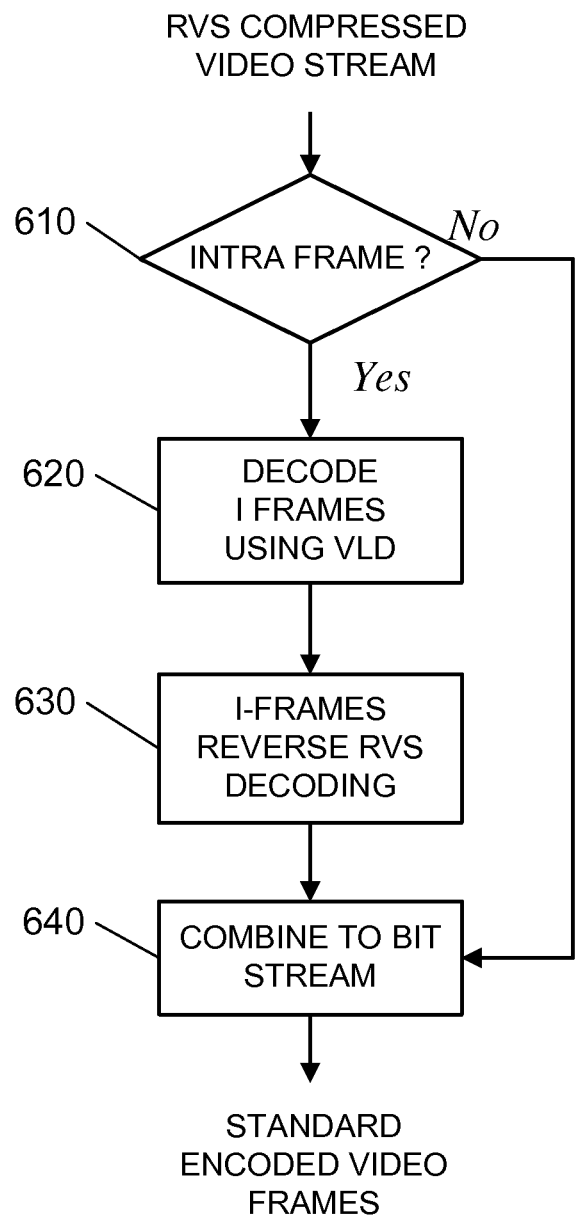
FIG. 6 is a flowchart illustration of the decompressing algorithm according to embodiments of the invention.

Reference is now made to FIG. 6, which is a flowchart illustration of the decompressing algorithm according to embodiments of the invention. According to embodiments of the invention, I-frames are separated from the INTER frames (block 610). Determining which frame is an I-frame may be done by reading the respective field of the frame header. I-frames may be decoded (block 620) using standard VLD. Decoding I-frames using VLD may reverse the last phase of INTRA compression, e.g., the VLC, and may result in blocks which contain the DCT coefficients of the I-frame after quantization. The decoded I-frames may then be decompressed (block 630). I-frames decompression method are described in further detail herein with reference to FIG. 7. The decompressed I-frames may then be combined with the substantially untouched INTER frames to create the standard video stream (block 640).

Figure 7:
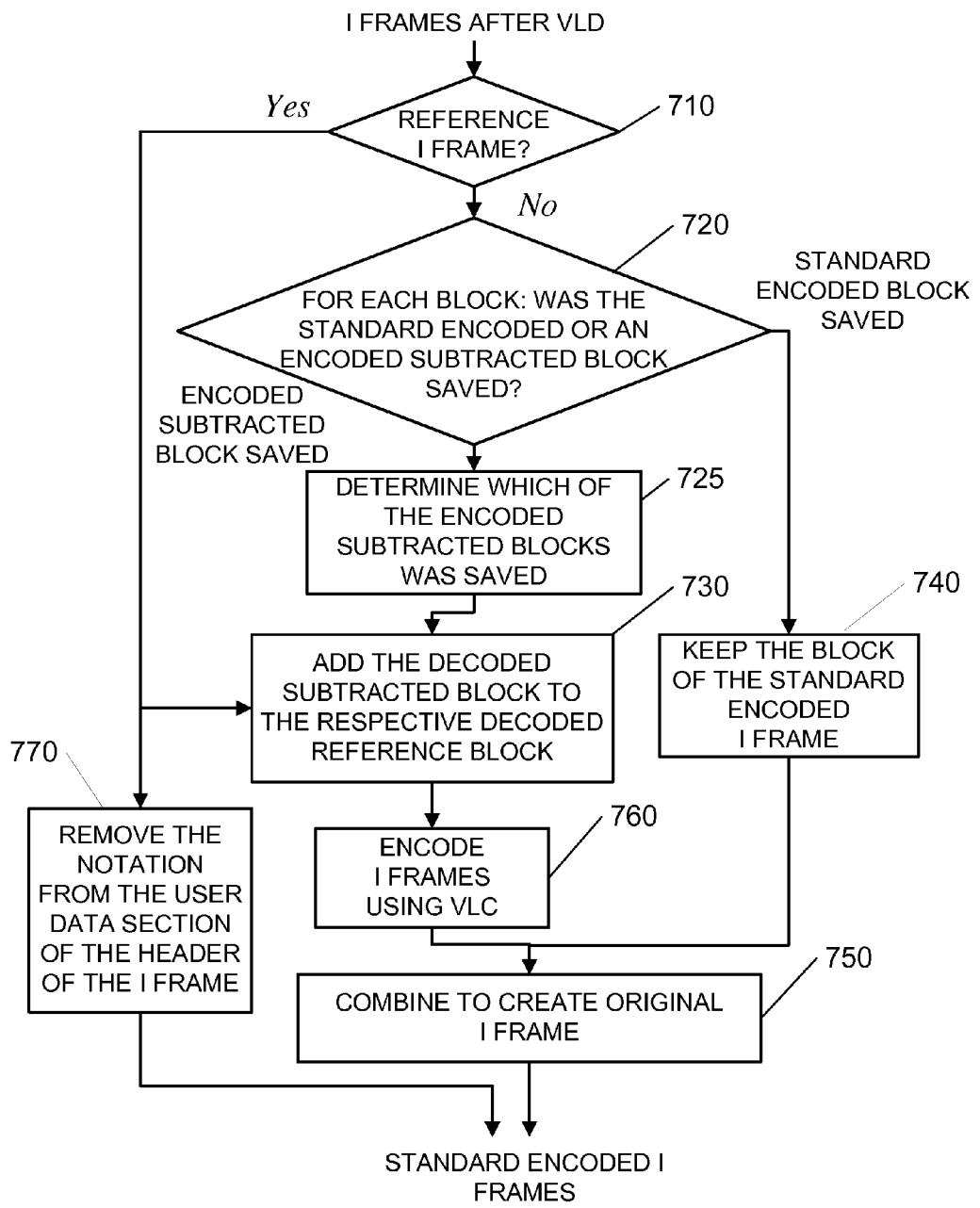
FIG. 7 is a flowchart illustration of a method for performing decompression of I-frames according to embodiments of the invention.

Reference is now made to FIG. 7, which is a flowchart illustration of a method for performing decompression of I-frames according to embodiments of the invention. According to embodiments of the invention, the method illustrated in FIG. 7 may be an expansion of block 630 of FIG. 6. According to embodiments of the invention, it may be checked whether the current frame is a reference I-frame (block 710). For example, it may be verified whether the current frame is an I-frame by checking the notation added to the user data section of the reference I-frame in the compression of I-frames process described with reference to FIG. 5. If the current I-frame is not a reference I-frame, then for each block of the current I-frame, it may be determined whether the standard encoded block or an encoded subtracted block was saved in the compression process (block 720). In case there were several possible encoded subtracted blocks, it may be determined which of encoded subtracted blocks was saved (block 725). If an encoded subtracted block was saved, then the decoded subtracted block may be added to the respective reference decoded block (block 730) to reproduce the original block of the I-frame. The reference decoded block may be the respective decoded block of the respective reference I-frame, the respective decoded block of the previous I-frame, or an average of a plurality of the respective decoded blocks of the previous or next I-frames. According to embodiments of the invention, it may be determined whether the standard encoded block or an encoded subtracted block was saved, and which of encoded subtracted blocks was saved in case there were several possible encoded subtracted blocks by checking the respective bits of the bitmap that was added to the MB header in the compression process. For example, the bits of the bitmap described with relation to block 580 of FIG. 5 may be checked.

The reproduced original blocks of the I-frame may then be encoded using standard encoding schemes such as, for example, VLC (block 760) to reproduce the standard encoded blocks of the I-frame. If the standard encoded block was saved, then there may not be a need to perform the addition (block 740). Next, the reproduced standard encoded blocks and the standard encoded blocks may be combined to obtain a standard encoded I-frame. If the current I-frame is a reference I-frame, then the notation added to the user data section of the header of the reference I-frame in block 525 may be removed (block 770). The standard encoded I-frames of the regular I-frames may then be combined with the reference I-frames to produce standard encoded I-frames.

Reference is made to FIGS. 8A and 8B, depicting illustrations of an exemplary frame structure of a standard encoded video stream 810 (FIG. 8A) and the same video stream after compression using the RVS compression algorithm 850 (FIG. 8B) according to embodiments of the invention. Standard encoded video stream 810 may be a result of relative video encoding according to relative video standards, such as H263, H263+, MPEG4 or H264. In the figures, I-frames are marked with the letter I (820), and INTER frames are market with the letter P (830). Arrows (840) show the dependencies between frames. In the example shown in FIG. 8A, all INTER frames 830 are encoded with dependency to the previous frame while I-frames 820 have no dependencies. It will be noted that while in the example presented in FIG. 8A, each INTER frame is encoded with dependency to a prior frame, other dependencies may be present in the encoded video stream, as supported by the encoding standards. In the compressed video stream 850, I-frames 860 and 865 are reference I-frames, and I-frames 870 and 875 are regular I-frames compressed with dependency on I-frame 860.

Reference is now made to Table 1 presenting results of the RVS compression on grayscale blocks of a number of video surveillance clips. The term bits saved refers to the total number of bits saved as a result of the RVS compression, disregarding the number of bits of the bitmap added to the MBs header of the compressed I-frames.

It will be recognized that applications of the RVS compressing and decompressing algorithms are not limited to surveillance systems, but may be used for any of various applications in which storage of large amounts of video data may be required or desirable. Examples may include, but are not limited to, headends, various video archives such as entertainment or medical video archives etc.

Some embodiments of the present invention may be implemented in software for execution by a processor-based system, for example, RVS encoder 150 and reverse-RVS decoder 170. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of

TABLE 1

Results of an embodiment of RVS compression on grayscale blocks of video surveillance clips

| | | NVE1008_Parking_ 640 Kbps. 264 | NVE1008_Lobby_ 384 Kbps. 264 | NVE1008_Yard_ 512 Kbps | Arecont_2MP_Junction_ 4096 Kbps |
|---|---|---|---|---|---|
| Standard encoded video | Decoded frames | 1709 | 1578 | 1376 | 255 |
| | Frame rate | 25 | 25 | 25 | 13 |
| | Intra cycle | 17 | 17 | 17 | 16 |
| | Bit rate [Kbps] | 631 | 373 | 413 | 4,213 |
| | Intra BR % | 38.85 | 46.56 | 58.23 | 38.51 |
| | File size in Bytes | 5,521,002 | 3,062,367 | 2,963,828 | 10,485,760 |
| Compressed video (Ref frame = i − 1, avg4 RIC = 30 ) | Bits saved | 5,263,882 | 3,386,738 | 4,651,911 | 9,813,151 |
| | Uncompressed bitmap size | 1,140,094 | 976,152 | 1,125,678 | 3,053,663 |
| | No. of original blocks | 343,042 | 332,160 | 267,700 | 1,282,423 |
| | No. of compressed blocks | 398,526 | 321,996 | 428,989 | 885,620 |
| | New File Size in Bytes | 5,005,529 | 2,761,044 | 2,523,049 | 9,640,824 |
| | Saving % | 9.34 | 9.84 | 14.87 | 8.06 |
| | Saving, % from INTRA | 24.03 | 21.14 | 25.54 | 20.93 |

It will be recognized based on the above table that an implementation of the above embodiment of the RVS compression algorithm may reduce video data size of already encoded video stream by up to approximately 20%. The amount of reduction may vary based on factors such as the relative encoding standard used for encoding the video stream, the IC, the RIC, the characteristics of the video scene, and other parameters. RVS compression and decompression may typically require relatively low processing power because it operates on encoded I-frames. Since it is possible to compress and decompress blocks one by one, RVS compression and decompression may not require large memory sizes for performing the compression and decompression. RVS compression and decompression may be lossless processes. Decompressing of compressed video stream may result in the original encoded video stream.

embodiments of the invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for compressing a video stream, the method comprising:
receiving a differentially encoded video stream comprising standard encoded video frames, wherein at least a portion of the standard encoded video frames are standard encoded I-frames;
compressing at least a portion of the standard encoded I-frames using relative compression to obtain compressed encoded I-frames; and
replacing the standard encoded I-frames in the video stream with the compressed encoded I-frames to obtain a compressed encoded video stream, wherein compressing comprises:
decoding the standard encoded I-frames using variable length decoding (VLD) to obtain decoded I-frames;
dividing the decoded I-frames into groups, each group having a respective reference I-frame;
for each block of each decoded I-frame that is not a reference I-frame:
subtracting the block of the decoded I-frame from at least one respective reference block to obtain at least one subtracted block;
encoding the at least one subtracted block using variable length coding (VLC) obtain at least one encoded subtracted block;
comparing the size of the at least one encoded subtracted block with the size of the respective block of the respective standard encoded I-frame; and
if one of the encoded subtracted block is smaller than the respective block of the respective standard encoded I-frame, then replacing the respective block of the standard encoded I-frame with the smallest respective encoded subtracted block; and
adding data to the I-frame indicating for each block of the I-frame whether the block is an encoded subtracted block, and an identification of said encoded subtracted block.

2. The method of claim 1, further comprising storing the compressed encoded video stream.

3. The method of claim 1, further comprising:
determining that the I-frame is a reference I-frame if (a) the standard encoded I-frame is the first I-frame of the video stream, or (b) it is full and not defective and the distance between the I-frame and the previous reference I-frame in the video stream is not smaller than a Reference Intra Cycle (RIC) parameter.

4. The method of claim 1, wherein the reference block is selected from a list comprising: a respective block of the reference I-frame of the group associated with the decoded I-frame, a respective block of a previous I-frame, an average of a plurality of respective blocks of previous I-frames of the group associated with the decoded I-frame, an average of a plurality of respective blocks of next I-frames of the group associated with the decoded I-frame and an average of a plurality of respective blocks of previous and next I-frames of the group associated with the decoded I-frame.

5. A method for decompressing a compressed video stream, the method comprising:
receiving a compressed encoded video stream;
identifying compressed encoded I-frames in the compressed encoded video stream;
decompressing the compressed encoded I-frames using relative decompression to obtain standard encoded I-frames;
replacing the compressed encoded I-frames in the compressed video stream with the standard encoded I-frames to obtain a standard encoded video stream; and
transmitting the standard encoded video stream,
wherein decompressing comprises:
decoding the compressed I-frames using variable length decoding (VLD) to obtain decoded compressed I-frames, wherein encoded subtracted blocks of the compressed I-frames are decoded to subtracted blocks;
determining whether the compressed I-frame is a reference I-frame;
for each block of each of the decoded compressed I-frames that is not a reference I-frame:
adding a subtracted block to a respective reference decoded block if the block is a subtracted block, to obtain a standard decoded block; and
encoding the standard decoded block using variable length coding (VLC) to obtain a standard encoded block; and
replacing encoded subtracted blocks of the compressed I-frame with the respective standard encoded blocks to obtain the standard encoded I-frame.

6. The method of claim 5, wherein receiving the compressed encoded video stream comprises retrieving the compressed encoded video stream from a storage.

7. The method of claim 5, wherein determining whether the compressed I-frame is a reference I-frame is based on a user data section of the compressed I-frame.

8. The method of claim 6, wherein the reference decoded block type is selectable from a list comprising: a respective decoded block of the respective I-frame, a respective decoded block of a previous I-frame, an average of a plurality of respective decoded blocks of previous I-frames of a group associated with the decoded compressed I-frame, an average of a plurality of respective blocks of next I-frames of the group associated with the decoded compressed I-frame and an average of a plurality of respective blocks of previous and next I-frames of the group associated with the decoded compressed I-frame.

9. The method of claim 8, further comprising:
determining whether the block is a subtracted block, and the type of the reference decoded block based on data associated with the I-frame.

10. A system for encoding a compressed video stream, the system comprising:
an encoder to receive a differentially encoded video stream comprising standard encoded video frames, wherein at least a portion of the standard encoded video frames are standard encoded I-frames, to compress at least a portion of the standard encoded I-frames using relative compression to obtain compressed encoded I-frames, and to replace the standard encoded I-frames in the video stream with the compressed encoded I-frames to obtain a compressed encoded video stream,
wherein the encoder is to compress by:
decoding the standard encoded I-frames using variable length decoding (VLD) to obtain decoded I-frames;
dividing the decoded I-frames into groups, each group having a respective reference I-frame;
for each block of each decoded I-frame that is not a reference I-frame:
subtracting the block of the decoded I-frame from at least one respective reference block to obtain at least one subtracted block;

encoding the at least one subtracted block using variable length coding (VLC) obtain at least one encoded subtracted block;

comparing the size of the at least one encoded subtracted block with the size of the respective block of the respective standard encoded I-frame; and if one of the encoded subtracted block is smaller than the respective block of the respective standard encoded I-frame, then replacing the respective block of the standard encoded I-frame with the smallest respective encoded subtracted block; and adding data to the I-frame indicating for each block of the I-frame whether the block is an encoded subtracted block, and an identification of said encoded subtracted block.

11. The system of claim 10, further comprising:
storage to store the compressed encoded video stream.

12. The system of claim 10, further comprising:
a decoder to retrieve the compressed encoded video stream, to identify compressed encoded I-frames in the compressed encoded video stream, to decompress the compressed encoded I-frames using relative decompression to thereby obtain standard encoded I-frames, to replace the compressed encoded I-frames in the compressed video stream with the standard encoded I-frames to thereby obtain a standard encoded video stream and to transmit the standard encoded video stream.

13. The system of claim 12, further comprising storage to store the compressed encoded video stream, wherein said decoder is to retrieve the compressed encoded video stream from the storage.

14. The system of claim 10, wherein the encoder is further to determine that the I-frame is a reference I-frame if (a) the standard encoded I-frame is the first I-frame of the video stream, or (b) it is full and not defective and the distance between the I-frame and the previous reference I-frame in the video stream is not smaller than a Reference Intra Cycle (RIC) parameter.

15. The system of claim 10, wherein the reference block is selected from a list comprising: a respective block of the reference I-frame of the group associated with the decoded I-frame, a respective block of a previous I-frame, an average of a plurality of respective blocks of previous I-frames of the group associated with the decoded I-frame, an average of a plurality of respective blocks of next I-frames of the group associated with the decoded I-frame and an average of a plurality of respective blocks of previous and next I-frames of the group associated with the decoded I-frame.

16. A system for encoding and decoding a compressed video stream, the system comprising:
an encoder to receive a differentially encoded video stream comprising standard encoded video frames, wherein at least a portion of the standard encoded video frames are standard encoded I-frames, to compress at least a portion of the standard encoded I-frames using relative compression to obtain compressed encoded I-frames, and to replace the standard encoded I-frames in the video stream with the compressed encoded I-frames to obtain a compressed encoded video stream; and a decoder to retrieve the compressed encoded video stream, to identify compressed encoded I-frames in the compressed encoded video stream, to decompress the compressed encoded I-frames using relative decompression to thereby obtain standard encoded I-frames, to replace the compressed encoded I-frames in the compressed video stream with the standard encoded I-frames to thereby obtain a standard encoded video stream and to transmit the standard encoded video stream, wherein the decoder is to decompress the compressed I-frames by:
decoding the compressed I-frames using variable length decoding (VLD) to obtain decoded compressed I-frames, wherein encoded subtracted blocks of the compressed I-frames are decoded to subtracted blocks;

determining whether the compressed I-frame is a reference I-frame;

for each block of each of the decoded compressed I-frames that is not a reference I-frame:
adding a subtracted block to a respective reference decoded block if the block is a subtracted block, to obtain a standard decoded block; and encoding the standard decoded block using variable length coding (VLC) to obtain a standard encoded block; and replacing encoded subtracted blocks of the compressed I-frame with the respective standard encoded blocks to obtain the standard encoded I-frame.

17. The system of claim 16, wherein determining whether the compressed I-frame is a reference I-frame is based on a user data section of the compressed I-frame.

18. The system of claim 16, wherein the reference decoded block is selected from a list comprising: a respective decoded block of the respective I-frame, a respective decoded block of a previous I-frame, an average of a plurality of respective decoded blocks of previous I-frames of a group associated with the decoded compressed I-frame, an average of a plurality of respective blocks of next I-frames of the group associated with the decoded compressed I-frame and an average of a plurality of respective blocks of previous and next I-frames of the group associated with the decoded compressed I-frame.

19. The system of claim 18, wherein the decoder is further to determine whether the block is a subtracted block, and the type of the reference decoded block based on data associated with the I-frame.

* * * * *